(12) United States Patent
Tamaizumi

(10) Patent No.: US 11,738,798 B2
(45) Date of Patent: Aug. 29, 2023

(54) TURNING CONTROL SYSTEM

(71) Applicant: JTEKT CORPORATION, Osaka (JP)

(72) Inventor: Terutaka Tamaizumi, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 641 days.

(21) Appl. No.: 16/856,607

(22) Filed: Apr. 23, 2020

(65) Prior Publication Data
US 2020/0339188 A1 Oct. 29, 2020

(30) Foreign Application Priority Data

Apr. 26, 2019 (JP) ................................. 2019-086317

(51) Int. Cl.
*B62D 5/04* (2006.01)
*B62D 5/00* (2006.01)
*B62D 6/02* (2006.01)
*B62D 15/02* (2006.01)

(52) U.S. Cl.
CPC ........... *B62D 5/0463* (2013.01); *B62D 5/006* (2013.01); *B62D 5/0484* (2013.01); *B62D 6/02* (2013.01); *B62D 15/021* (2013.01)

(58) Field of Classification Search
CPC ........ B62D 5/0463; B62D 5/006; B62D 6/02; B62D 15/021
See application file for complete search history.

(56) References Cited

U.S. PATENT DOCUMENTS

| 6,032,757 | A | 3/2000 | Kawaguchi et al. |
| 9,327,760 | B2 * | 5/2016 | Tamaizumi .......... B62D 5/0472 |
| 9,802,645 | B2 * | 10/2017 | Kudo .................. B62D 5/0463 |
| 9,889,879 | B2 * | 2/2018 | Namikawa ............... B62D 3/12 |
| 9,937,954 | B2 * | 4/2018 | Kudo .................... B62D 6/008 |
| 10,099,722 | B2 * | 10/2018 | Kodera ................. B62D 6/008 |
| 10,131,379 | B2 * | 11/2018 | Kodera ................. B62D 6/008 |
| 10,286,946 | B2 * | 5/2019 | Nishimura ........... B62D 15/025 |
| 10,661,829 | B2 * | 5/2020 | Badiru ................. B62D 6/008 |

(Continued)

FOREIGN PATENT DOCUMENTS

EP    2 803 558 A2    11/2014
EP    3 213 979 A1    9/2017

(Continued)

OTHER PUBLICATIONS

Oct. 6, 2020 European Search Report issued in European Patent Application No. 20171086.0.

*Primary Examiner* — Kevin Hurley
*Assistant Examiner* — Michael R Stabley
(74) *Attorney, Agent, or Firm* — Oliff PLC

(57) ABSTRACT

A turning control system includes a controller. The controller is configured to perform a decrease process of decreasing a magnitude of an angle operation amount which is reflected in an operation process with respect to the magnitude of the angle operation amount calculated in an angle operation amount calculating process when a vehicle speed is equal to or lower than a prescribed speed and a magnitude of an input torque of a steering wheel is equal to or less than a prescribed value. The controller is configured to perform a correction process of correcting an input when the decrease process is performed such that a magnitude of the input decreases when an angle command value calculating process calculates an angle command value.

7 Claims, 3 Drawing Sheets

(56) References Cited

U.S. PATENT DOCUMENTS

| | | | | |
|---|---|---|---|---|
| 10,933,909 B2* | 3/2021 | Kodera | ............... | B62D 1/166 |
| 2006/0037806 A1* | 2/2006 | Kasahara | ............... | B62D 5/003 |
| | | | | 180/402 |
| 2014/0229068 A1* | 8/2014 | Ueyama | ............... | B60W 10/20 |
| | | | | 701/41 |
| 2015/0353126 A1* | 12/2015 | Chai | ............... | B62D 6/04 |
| | | | | 701/42 |
| 2017/0021858 A1* | 1/2017 | Kodera | ............... | B62D 5/0469 |
| 2019/0092384 A1 | 3/2019 | Kodera et al. | | |

FOREIGN PATENT DOCUMENTS

| | | |
|---|---|---|
| JP | 2006-175940 A | 7/2006 |
| WO | 2014/049939 A1 | 4/2014 |

\* cited by examiner

TURNING CONTROL SYSTEM

CROSS-REFERENCE TO RELATED APPLICATION

This application claims priority to Japanese Patent Application No. 2019-086317 filed on Apr. 26, 2019, incorporated herein by reference in its entirety.

BACKGROUND

1. Technical Field

The present disclosure relates to a turning control system that operates a turning actuator having an electric motor incorporated thereinto and turning a turning wheel.

2. Description of Related Art

For example, Japanese Unexamined Patent Application Publication No. 2006-175940 (JP 2006-175940 A) discloses a device that operates an electric motor which is incorporated into a turning actuator that turns turning wheels based on an operation amount in feedback control based on a difference between a target steering torque and an actual steering torque and an operation amount in feedback control based on a difference between a target turning angle and an actual turning angle.

SUMMARY

For example, when a vehicle stops in a state in which a steering wheel has been turned forward, a force for returning to a neutral position acts on turning wheels. At this time, when feedback control is not performed, the turning wheels are displaced to a position at which a frictional force between the turning wheels and a road surface is balanced with the force for returning and then stops. However, when feedback control is performed, a torque of an electric motor is generated to maintain a turning angle at a target turning angle. Accordingly, when a user does not operate the steering wheel at the time of stopping, a state in which a current flowing in the electric motor is large is maintained due to feedback control of a detected value of the turning angle to the target turning angle which is not necessarily requested by the user, and thus there is concern about power consumption increasing.

According to an aspect of the present disclosure, there is provided a turning control system that operates a turning actuator having an electric motor incorporated thereinto and turning a turning wheel. The turning control system includes a controller. The controller is configured to perform a steering operation amount calculating process of calculating a steering operation amount which is an operation amount which is convertible to a torque required for the electric motor as an operation amount of the electric motor for turning the turning wheel to control a steering torque which is input by a driver to a target steering torque by feedback control. The controller is configured to perform an angle command value calculating process of calculating an angle command value which is a command value of a convertible angle which is convertible to a turning angle of the turning wheel based on the steering operation amount. The controller is configured to perform an angle operation amount calculating process of calculating an angle operation amount which is an operation amount which is convertible to a torque required for the electric motor as an operation amount for controlling the convertible angle to the angle command value by feedback control. The controller is configured to perform an operation process of operating a drive circuit of the electric motor to control the torque of the electric motor based on the angle operation amount. The controller is configured to perform a decrease process of decreasing a magnitude of the angle operation amount which is reflected in the operation process with respect to the magnitude of the angle operation amount calculated in the angle operation amount calculating process when a vehicle speed is equal to or lower than a prescribed speed and a magnitude of an input torque of the steering wheel is equal to or less than a prescribed value. The controller is configured to perform a correction process of correcting an input when the decrease process is performed such that a magnitude of the input decreases when the angle command value calculating process calculates the angle command value.

With the turning control system according to one aspect of the present disclosure, it is possible to decrease a current flowing in the electric motor by decreasing the magnitude of the angle operation amount which is reflected in the operation process using the decrease process when the vehicle speed is equal to or lower than the prescribed speed and the magnitude of the input torque of the steering wheel is equal to or less than the prescribed value. Here, when the magnitude of the input torque is equal to or less than the prescribed value, there is a high likelihood that a driver will not have an intention of steering. Accordingly, by decreasing the current flowing in the electric motor with respect to a current required for feedback control of the convertible angle to the angle command value when there is a high likelihood that a driver will not have an intention of steering, it is possible to avoid going against a driver's intention and to decrease the current flowing in the electric motor.

The angle operation amount which is calculated in the angle operation amount calculating process is an operation amount which is suitable for the angle command value. Accordingly, when the angle operation amount serving as an input of the operation process is insufficient for the angle operation amount calculated in the angle operation amount calculating process, there is concern that the convertible angle may greatly diverge from the angle command value. When the convertible angle greatly diverges from the angle command value, the absolute value of the angle operation amount calculated in the angle operation amount calculating process increases excessively and the convertible angle is deviates from a value suitable for the angle command value. Therefore, in the above-mentioned configuration, by correcting the input of the angle command value calculating process to decrease when the decrease process is performed, it is possible to cause the angle command value to approach the convertible angle and to curb an excessive increase of the absolute value of the angle operation amount.

In the turning control system according to one aspect of the present disclosure, the controller may be configured to perform the decrease process when transmission of power between the steering wheel and the turning wheel is cut off.

With the turning control system according to one aspect of the present disclosure, when transmission of power between the steering wheel and the turning wheel is cut off, the angle command value corresponding to an operation of the steering wheel when the magnitude of the input torque of the steering wheel is small is likely to diverge from the convertible angle which can be maintained regardless of the torque of the electric motor. Accordingly, with the above-mentioned configuration, the decrease process is particularly useful.

In the turning control system according to one aspect of the present disclosure, the decrease process may be a process of gradually decreasing the magnitude of the angle operation amount which is reflected in the operation process with respect to the magnitude of the angle operation amount calculated in the angle operation amount calculating process.

With the turning control system according to one aspect of the present disclosure, it is possible to gradually decrease the current flowing in the electric motor by gradually decreasing the magnitude of the angle operation amount. Accordingly, since the rate of decrease of the torque of the electric motor can be set to be lower in comparison with a case in which the angle operation amount is decreased stepwise, it is possible to curb sudden displacement of the turning wheel.

In the turning control system according to one aspect of the present disclosure, the angle command value calculating process may include a change process of changing a relationship of an output with the input when the decrease process is performed.

When the angle operation amount which is reflected in the operation process is decreased by the decrease process and the angle operation amount calculating process is not sufficiently reflected in control of the turning angle, there is concern that stability of the angle command value calculating process may be impaired. With the turning control system according to one aspect of the present disclosure, by changing the relationship of the output with the input of the angle command value calculating process when the decrease process is performed, the relationship of the output with the input can be set to a relationship that can curb a decrease in stability even when the angle operation amount calculating process is not sufficiently reflected in control of the turning angle.

In the turning control system according to one aspect of the present disclosure, the operation process may include a process of controlling the torque of the electric motor based on the angle operation amount regardless of the steering operation amount. In the turning control system according to one aspect of the present disclosure, the decrease process may include at least a determination process of determining whether at least a condition that the vehicle speed is equal to or lower than the prescribed speed, a condition that the magnitude of the input torque is equal to or less than the prescribed value, and a condition that a magnitude of a steering rate is equal to or lower than a prescribed rate are all satisfied. The decrease process may be a process of decreasing the magnitude of the angle operation amount which is reflected in the operation process with respect to the magnitude of the angle operation amount which is calculated in the angle operation amount calculating process when it is determined in the determination process that all the conditions are satisfied.

With the turning control system according to one aspect of the present disclosure, it is possible to accurately determine whether problems are less likely to be caused even when a driver does not have an intention of steering the steering wheel and the current actually flowing in the electric motor is made to be less than the current required for feedback control of the turning angle.

In the turning control system according to an aspect of the present disclosure, the controller may be configured to perform a target steering torque calculating process of calculating the target steering torque based on a sum of amounts which are obtained by converting the steering operation amount and the steering torque to a force acting on the same object.

Since the steering operation amount can be converted to a torque required for the electric motor, a force which is applied from the vehicle side to turn the turning wheels is determined based on the steering operation amount and the steering torque, and this force can be converted to a lateral force. On the other hand, a target steering torque which is required for improving a feeling of steering for a driver is likely to be determined based on the lateral force. Accordingly, with the turning control system according to the aspect of the present disclosure, it is possible to easily design the target steering torque calculating process by determining the target steering torque based on the sum.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
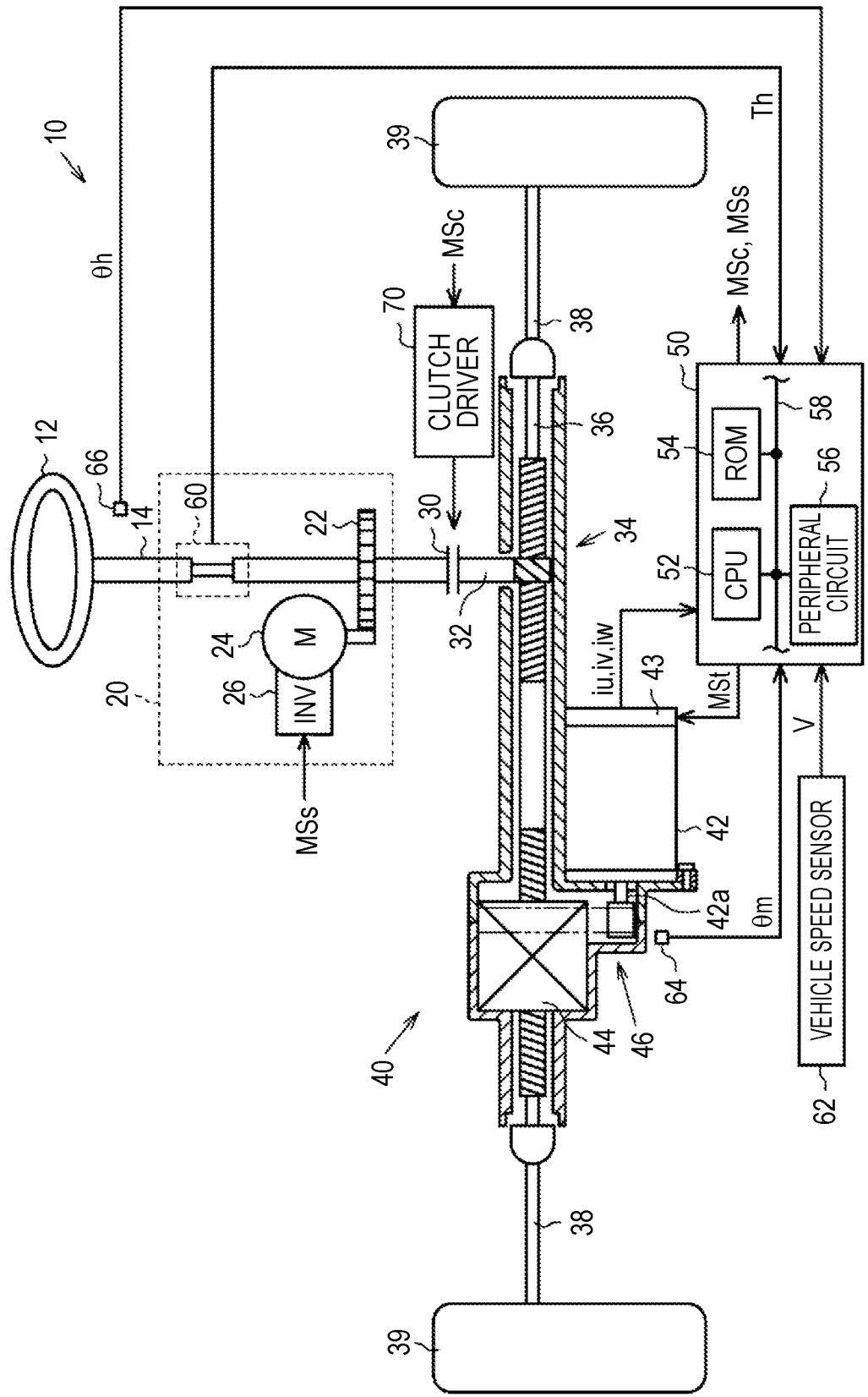
FIG. 1 is a diagram illustrating an electric power steering system according to an embodiment.

Hereinafter, a turning control system according to an embodiment will be described with reference to the accompanying drawings. An electric power steering system 10 illustrated in FIG. 1 is mounted in a vehicle including only an internal combustion engine as an onboard power source that generates thrust of the vehicle. In the electric power steering system 10, a steering wheel 12 is connected to a drag force actuator 20 that applies a drag force which resists an operation of the steering wheel 12. The drag force actuator 20 includes a steering shaft 14 that is fixed to the steering wheel 12, a reduction gear 22, an electric motor 24 of which a rotation shaft is connected to the reduction gear 22, and an inverter 26 that applies an alternating-current voltage to terminals of the electric motor 24. In this embodiment, a surface permanent magnet synchronous motor (SPMSM) is exemplified as the electric motor 24.

The steering shaft 14 can be connected to a pinion shaft 32 via a clutch 30. A bottom end of the pinion shaft 32 is connected to a rack shaft 36 via a rack and pinion mechanism 34. Right and left turning wheels 39 are connected to both ends of the rack shaft 36 via tie rods 38. Accordingly, when the clutch 30 is in an engaged state, a rotational motion of the steering wheel 12, that is, the steering shaft 14, is converted to a linear reciprocating motion in an axial direction (a right-left direction in FIG. 1) of the rack shaft 36 via the rack and pinion mechanism 34 including the pinion shaft 32 and the rack shaft 36. The linear reciprocating motion is transmitted to the turning wheels 39 via the tie rods 38 connected to both ends of the rack shaft 36, whereby a turning angle of the turning wheels 39 is changed.

On the other hand, a turning actuator 40 includes the rack shaft 36, an electric motor 42, an inverter 43, a ball screw mechanism 44, and a belt type reduction gear mechanism 46. The electric motor 42 is a source of power for turning the turning wheels 39 and, for example, a surface permanent magnet synchronous motor (SPMSM) can be used as the electric motor 42 in this embodiment. The ball screw mechanism 44 is integrally attached in the vicinity of the rack shaft 36 and the belt type reduction gear mechanism 46 transmits a rotational force of an output shaft 42a of the electric motor 42 to the ball screw mechanism 44. The rotational force of the output shaft 42a of the electric motor 42 is converted to a force for reciprocating linearly the rack shaft 36 in the axial direction via the belt type reduction gear mechanism 46 and the ball screw mechanism 44. The turning wheels 39 can be turned by the force in the axial direction which is applied to the rack shaft 36.

A turning control system 50 controls the turning wheels 39 and operates the turning actuator 40 to control a turning angle which is a control parameter thereof. The turning control system 50 controls the control parameter with reference to a steering torque Th which is a torque input via the steering wheel 12 by a driver and detected by a torque sensor 60, a vehicle speed V which is detected by a vehicle speed sensor 62, and a rotational angle θm of the output shaft 42a which is detected by a rotational angle sensor 64. The turning control system 50 also refers to a rotational angle of the steering wheel 12 (a steering angle θh) which is detected by a steering angle sensor 66 and currents iu, iv, and iw flowing in the electric motor 42. The currents iu, iv, and iw can be detected as voltage drops in a shunt resistor which is provided in each leg of the inverter 43.

The turning control system 50 includes a CPU (a controller) 52, a ROM 54, and a peripheral circuit 56, which are connected to each other via a communication line 58. The peripheral circuit 56 includes a circuit that generates a clock signal for defining internal operations, a power supply circuit, and a reset circuit.

Figure 2:
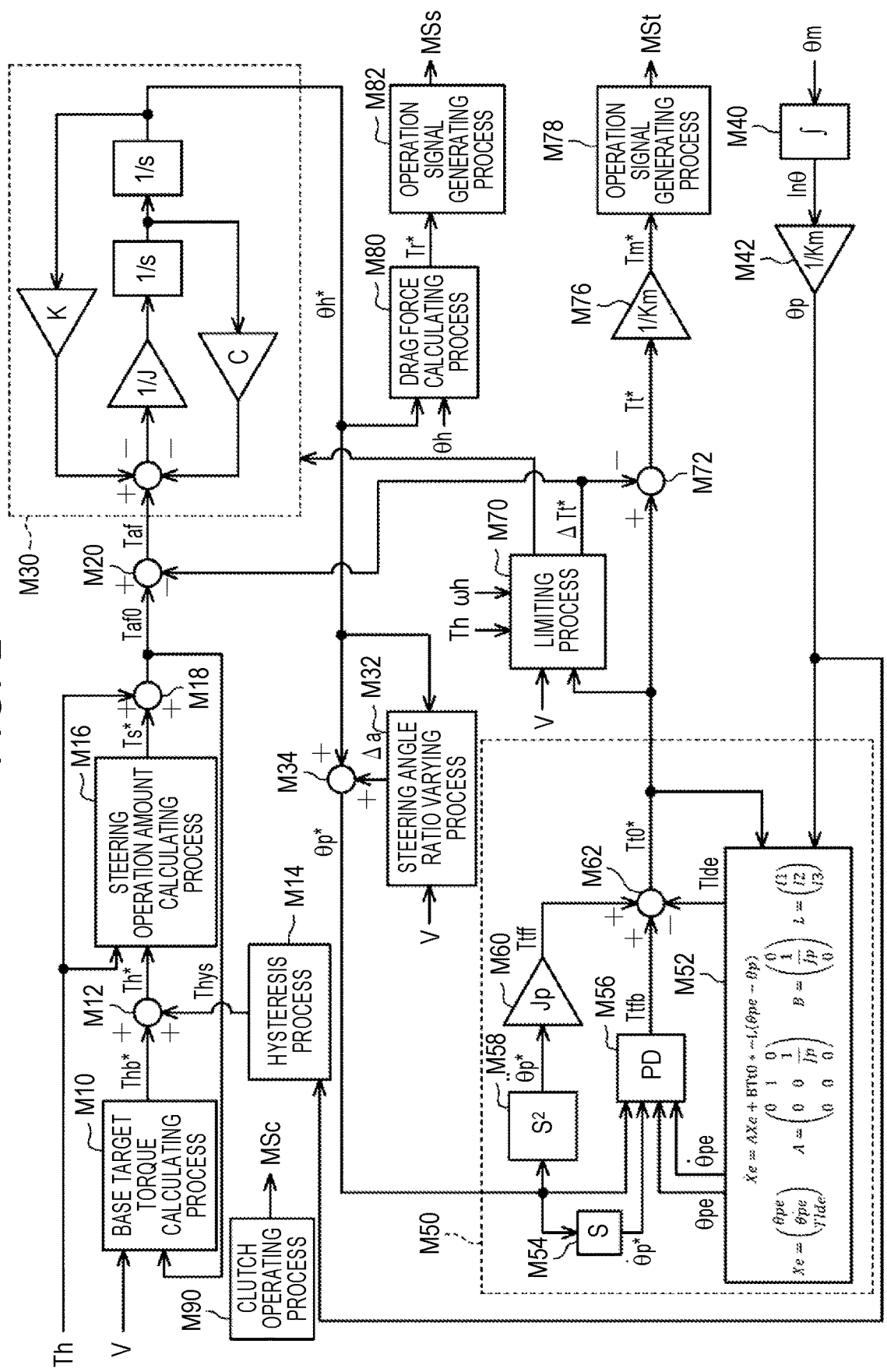
FIG. 2 is a block diagram illustrating processes which are performed by a turning control system according to the embodiment.

FIG. 2 illustrates some processes which are performed by the turning control system 50. The processes illustrated in FIG. 2 are realized by causing the CPU 52 to execute a program stored in the ROM 54. A base target torque calculating process M10 is a process of calculating a base target torque Thb* which is a base value of a target steering torque Th* which is to be input to the steering shaft 14 via the steering wheel 12 by a driver based on an axial force Taf0 which will be described later. Here, the axial force Taf0 is a force in an axial direction which is applied to the rack shaft 36. Since the axial force Taf0 is an amount corresponding to a lateral force acting on the turning wheels 39, the lateral force can be ascertained from the axial force Taf0. On the other hand, a torque which is to be input to the steering shaft 14 via the steering wheel 12 by a driver is preferably determined based on the lateral force. Accordingly, the base target torque calculating process M10 is a process of calculating the base target torque Thb* based on the lateral force which is ascertained from the axial force Taf0.

Specifically, the base target torque calculating process M10 is a process of calculating, even when the absolute value of the axial force Taf0 is the same, the absolute value of the base target torque Thb* to be less when the vehicle speed V is low than when the vehicle speed V is high. This can be realized, for example, by causing the CPU 52 to map-calculate the base target torque Thb* in a state in which map data with the axial force Taf0 or the lateral acceleration which is ascertained from the axial force Taf0 and the vehicle speed V as input variables and with the base target torque Thb* as an output variable is stored in the ROM 54 in advance. Here, map data is pair data of discrete values of the input variables and values of the output variables corresponding to the values of the input variables. For example, the map calculation is a process of outputting the value of output variable of the map data corresponding to the value of input variable of the map data as a result of calculation when a value of one input variable matches one of the values of the input variables of the map data and outputting a value obtained by interpolation of values of a plurality of output variables included in the map data as a result of calculation when the value of one input variable does not match one value of the input variables.

A hysteresis process M14 is a process of calculating and outputting a hysteresis correction amount Thys for correcting the base target torque Thb* based on a rotational angle of the pinion shaft 32 (a pinion angle θp) which is a convertible angle which can be converted to the turning angle of the turning wheels 39. Specifically, the hysteresis process M14 includes a process of identifying switching forward and switching back of the steering wheel 12 based on a change of the pinion angle θp or the like and calculating a hysteresis correction amount Thys such that the absolute value of the target steering torque Th* is greater at the time of switching forward than at the time of switching back. More specifically, the hysteresis process M14 includes a process of setting the hysteresis correction amount Thys to be variable based on the vehicle speed V.

An addition process M12 is a process of calculating the target steering torque Th* by adding the hysteresis correction amount Thys to the base target torque Thb*. A steering operation amount calculating process M16 is a process of calculating a steering operation amount Ts* which is an operation amount for controlling a steering torque Th to the target steering torque Th* by feedback control. The steering operation amount Ts* is an amount including an operation amount for controlling the steering torque Th to the target steering torque Th* by feedback control and may include a feed-forward term. An operation amount for feedback control is an amount for increasing the magnitude (absolute value) of a required torque for the electric motor 42, for example, when signs of both the steering torque Th and the target steering torque Th* are positive and the steering torque Th is greater than the target steering torque Th*. The steering operation amount Ts* is an amount corresponding to the required torque for the electric motor 42 in feedback control of the steering torque Th to the target steering torque Th*, and the steering operation amount Ts* is an amount which has been converted to a torque which is applied to the steering shaft 14 in this embodiment.

An axial force calculating process M18 is a process of calculating the axial force Taf0 by adding the steering torque Th to the steering operation amount Ts*. Since the steering torque Th is a torque which is applied to the steering shaft 14, the axial force Taf0 in this embodiment is a value obtained by converting a force which is applied to the rack shaft 36 in the axial direction to a torque which is applied to the steering shaft 14.

A subtraction process M20 is a process of calculating an axial force Taf by subtracting a decrease correction amount ΔTt* from the axial force Taf0. A normative model calculating process M30 is a process of calculating a steering angle command value θh* which is a command value of the steering angle θh based on the axial force Taf. Specifically, the normative model calculating process M30 is a process of calculating the steering angle command value θh* using a model formula which is expressed by Expression (c1).

$$Taf = K \cdot \theta h^* + C \cdot \theta h^{*\prime} + J \cdot \theta h^{*\prime\prime} \tag{c1}$$

The model expressed by Expression (c1) is a model of a value indicated by the steering angle θh when the clutch 30 is in the engaged state and the same amount of torque as the axial force Taf is input to the steering shaft 14. In Expression (c1), a stickiness coefficient C is a model of friction of the electric power steering system 10 or the like, an inertia coefficient J is a model of an inertia of the electric power steering system 10, and an elasticity coefficient K is a model of specifications such as suspension and wheel alignment of a vehicle in which the electric power steering system 10 is mounted. This model is not a model that accurately expresses the actual electric power steering system 10 or the vehicle in which the electric power steering system 10 is mounted, but is a normative model which is designed to change behavior of the turning angle with an input to ideal behavior. In this embodiment, it is possible to adjust a feeling of steering by designing a normative model.

A steering angle ratio varying process M32 is a process of setting an adjustment amount Δa for varying a steering angle ratio which is a ratio of a command value of the turning angle to the steering angle command value θh* to be variable based on the vehicle speed V. Specifically, the adjustment amount Δa is set such that the change of the turning angle with the change of the steering angle is greater when the vehicle speed V is low than when the vehicle speed V is high. An addition process M34 sets the pinion angle command value θp* which is a command value of the rotational angle of the pinion shaft 32 (the pinion angle θp) which is a convertible angle which is convertible to the turning angle of the turning wheels 39 by adding the adjustment amount Δa to the steering angle command value θh*.

An integration process M40 is a process of calculating an integrated value Inθ of the rotational angle θm of the electric motor 42. In this embodiment, the turning angle of the turning wheels 39 when the vehicle moves straightly is set to "0" and the integrated value Inθ when the turning angle is "0" is set to "0." A conversion process M42 is a process of calculating the pinion angle θp by dividing the integrated value Inθ by a reduction gear ratio Km from the steering shaft 14 to the electric motor 42. The pinion angle θp represents a straight traveling direction when it is "0" and represents a right turning angle or a left turning angle depending on whether it is positive or negative.

An angle operation amount calculating process M50 is a process of calculating an angle operation amount Tt* which is an operation amount for controlling the pinion angle θp to the pinion angle command value θp* by feedback control. The angle operation amount Tt* is an amount corresponding to the required torque for the electric motor 42 in feedback control of the pinion angle θp to the pinion angle command value θp*, and is an amount which is converted to a torque which is applied to the steering shaft 14 in this embodiment.

The angle operation amount calculating process M50 includes a disturbance observer M52 of estimating a torque affecting the pinion angle θp as a disturbance torque in addition to the angle operation amount Tt* and setting it as an estimated disturbance torque Tlde. In this embodiment, the estimated disturbance torque Tlde is converted to a torque which is applied to the steering shaft 14.

The disturbance observer M52 calculates the estimated disturbance torque Tlde or an estimated value θpe of the pinion angle θp by Expression (c2) using an inertia coefficient Jp, the pinion angle θp, the angle operation amount Tt0*, and a matrix L of three rows and one column for defining observer gains 11, 12, and 13. The inertia coefficient Jp is a model of an inertia of the electric power steering system 10.

$$\dot{X}e = AXe + BTt0* - L(\theta pe - \theta p) \qquad (c2)$$

$$Xe = \begin{pmatrix} \theta pe \\ \dot\theta pe \\ Tlde \end{pmatrix} \ A = \begin{pmatrix} 0 & 1 & 0 \\ 0 & 0 & \frac{1}{Jp} \\ 0 & 0 & 0 \end{pmatrix} \ B = \begin{pmatrix} 0 \\ \frac{1}{Jp} \\ 0 \end{pmatrix} \ L = \begin{pmatrix} l1 \\ l2 \\ l3 \end{pmatrix}$$

A differentiation calculating process M54 is a process of calculating a pinion angular velocity command value by a differentiation calculation of the pinion angle command value θp*.

A feedback term calculating process M56 is a process of calculating a feedback operation amount Ttfb which is a sum of a proportional term based on a difference between the pinion angle command value θp* and the estimated value θpe and a differential term based on a difference between a differential value of the pinion angle command value θp* and a differential value of the estimated value θpe.

A second-order differentiation process M58 is a process of calculating a second-order time differential value of the pinion angle command value θp*. A feed-forward term calculating process M60 is a process of calculating a feed-forward operation amount Ttff by multiplying an output value of the second-order differentiation process M58 by the inertia coefficient Jp. A two-degree-of-freedom operation amount calculating process M62 is a process of calculating an angle operation amount Tt0* by subtracting the estimated disturbance torque Tlde from a sum of the feedback operation amount Ttfb and the feed-forward operation amount Ttff.

A limiting process M70 is a process of calculating the decrease correction amount ΔTt* based on the angle operation amount Tt0* or a process of changing a parameter of the normative model calculating process M30 based on the decrease correction amount ΔTt*.

A subtraction process M72 is a process of calculating an angle operation amount Tt* by subtracting the decrease correction amount ΔTt* from the angle operation amount Tt0*. A conversion process M76 is a process of converting the angle operation amount Tt* to a torque command value Tm* which is a command value of the torque for the electric motor 42 by dividing the angle operation amount Tt* by the reduction gear ratio Km.

An operation signal generating process M78 is a process of generating and outputting an operation signal MSt of the inverter 43 for controlling the torque for the electric motor 42 to the torque command value Tm*. The operation signal MSt is actually an operation signal for each arm of each leg of the inverter 43.

A drag force calculating process M80 is a process of calculating a torque command value Tr* for the electric motor 24 as an operation amount for feedback control of the steering angle θh to the steering angle command value θh*. An operation signal generating process M82 is a process of operating the inverter 26 by outputting an operation signal MSs to the inverter 26 to control the torque for the electric motor 24 to the torque command value Tr*.

A clutch operating process M90 includes a process of operating a clutch driver 70 illustrated in FIG. 1 such that the clutch 30 is switched to a disengaged state and transmission of power between the steering wheel 12 and the turning wheels 39 is cut off when it is determined that an IG signal which is a travel permission signal of the vehicle is switched from an OFF state to an ON state. In addition, the clutch operating process M90 includes a process of operating the clutch driver 70 such that the clutch 30 is switched from a disengaged state to an engaged state when it is determined that the IG signal is switched from the ON state to the OFF state. The IG signal is a signal for starting combustion control for an internal combustion engine.

Figure 3:
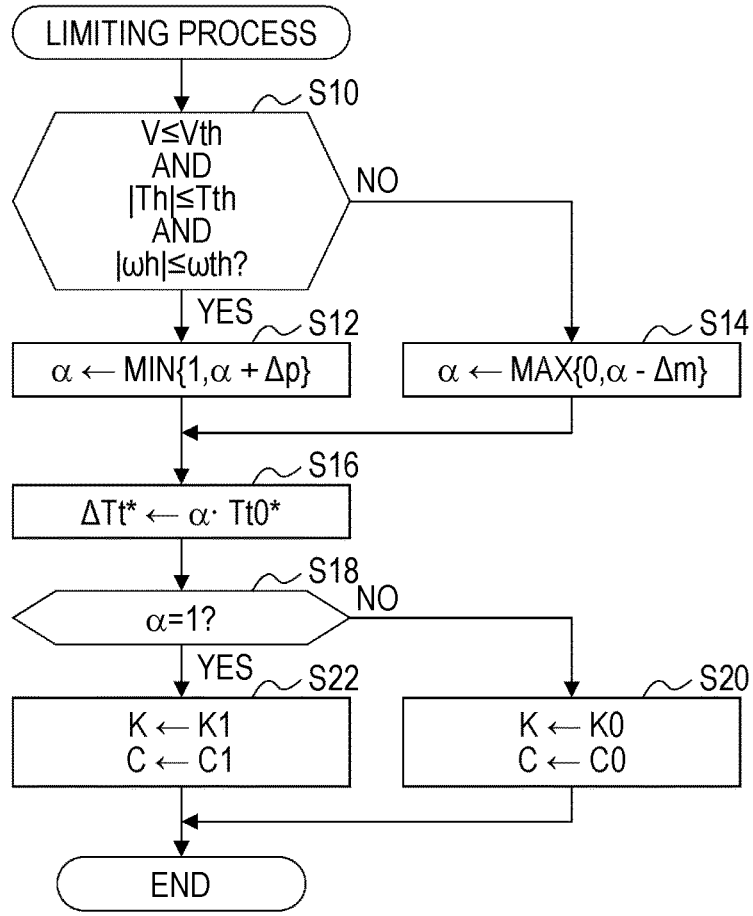
FIG. 3 is a flowchart illustrating a flow of a limiting process according to the embodiment.

FIG. 3 illustrates a flow of the limiting process M70. The process flow illustrated in FIG. 3 is realized by causing the CPU 52 to repeatedly execute a program stored in the ROM 54, for example, at intervals of a predetermined period. In the following description, a numeral prefixed with "S" denotes a step number of each process.

In the series of processes illustrated in FIG. 3, the CPU 52 first determines whether all of a condition (i) that the vehicle speed V is equal to or lower than a prescribed speed Vth, a condition (ii) that the magnitude (absolute value) of the steering torque Th is equal to or less than a prescribed value Tth, and a condition (iii) that the magnitude (absolute value) of a steering rate ωh is equal to or lower than a prescribed rate ωth are satisfied (S10). This process is, for example, a process of determining whether a driver is not operating the steering wheel 12 when the vehicle stops at a crossing or the like. Here, the prescribed speed Vth is a value for determining that a vehicle stops or almost stops and is a small value which is close to "0." The prescribed value Tth is a value for determining that a user is not operating the steering wheel 12 and is a value which is close to "0." The prescribed rate ωth is a value for determining that a user is not operating the steering wheel 12 and is a value which is close to "0." In addition, the steering rate ωh is a change per unit time of the steering angle θh and is calculated by the CPU 52.

When it is determined that all of the conditions (i) to (iii) are satisfied (S10: YES), the CPU 52 substitutes the smaller of a value obtained by adding a predetermined amount ΔP which is less than "1" to a gain α and "1" into the gain α (S12). This process is a process of gradually increasing the gain α from "0" to "1." An initial value of the gain α is "0." On the other hand, when it is determined that any one of the conditions (i) to (iii) is not satisfied (S10: NO), the CPU 52 substitutes the larger of a value obtained by decreasing the gain α by a predetermined amount Δm which is less than "1" and "0" into the gain α (S14). This process is a process of gradually decreasing the gain α from "1" to "0."

When the processes of S12 and S14 are completed, the CPU 52 substitutes a value obtained by multiplying the angle operation amount Tt0* by the gain α into the decrease correction amount ΔTt* (S16). Then, the CPU 52 determines whether the gain α is "1" (S18). Then, when it is determined that the gain α is not "1" (S18: NO), the CPU 52 substitutes a normal value K0 into the elasticity coefficient K and substitutes a normal value C0 into the stickiness coefficient C (S20). The normal values K0 and C0 are adapted to values for stabilizing the normative model calculating process M30 when the angle operation amount calculating process M50 is reflected in control of the turning angle. On the other hand, when it is determined that the gain α is "1" (S18: YES), the CPU 52 substitutes a changed value K1 into the elasticity coefficient K which is used for the normative model calculating process M30 to calculate the pinion angle command value θp* and substitutes a changed value C1 into the stickiness coefficient C (S22). The changed values K1 and C1 are adapted to values for stabilizing the normative model calculating process M30 when the angle operation amount calculating process M50 is not reflected in control of the turning angle.

In addition, when the processes of S20 and S22 are completed, the CPU 52 temporarily ends the series of processes illustrated in FIG. 3. Operations and advantages in this embodiment will be described below.

Figure 4:
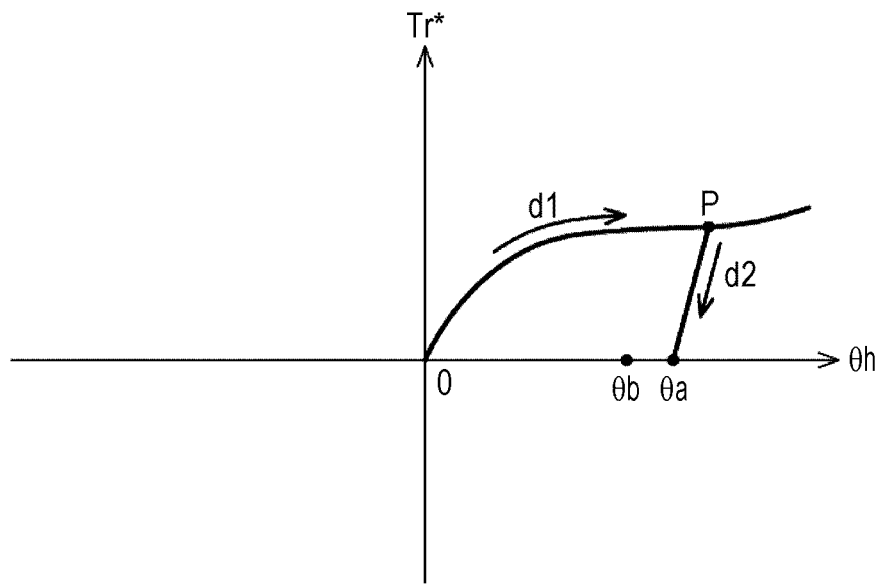
FIG. 4 is a diagram illustrating an operation according to the embodiment.

FIG. 4 illustrates a relationship between the steering angle θh and the torque command value Tr* for applying a drag force to the steering wheel 12. As illustrated in FIG. 4, when the steering angle θh increases from a state in which the steering angle θh is "0," the torque command value Tr* increases along a curve d1. Thereafter, for example, when a user stops the vehicle at a crossing or the like and stops the operation of the steering wheel 12 at the steering angle θh indicated by a point P in FIG. 4, the magnitude of the steering torque Th decreases. When the magnitude of the steering torque Th decreases, the magnitude of the steering angle command value θh* becomes less than the magnitude of the steering angle θh and the steering wheel 12 is returned to a neutral position. Accordingly, the torque command value Tr* decreases with a decrease of the magnitude of the steering angle θh along a curve d2 in FIG. 4 and the torque command value Tr* becomes "0" at a time appoint at which the steering angle θh is "θa." However, the pinion angle command value θp* which is set in this case is not necessarily an angle which is maintained even when the torque of the electric motor 42 is "0." For example, when the steering angle command value θh* at "θb" is an angle at which the pinion angle θp is maintained even when the torque of the electric motor 42 is "0," the pinion angle θp is maintained at the pinion angle command value θp* due to the angle operation amount Tt*. Actually, when a driver holds the steering wheel 12, the steering torque Th is not necessarily "0" and the steering angle θh is different from "θa." In this case, the pinion angle command value θp* which is set in this case is not necessarily an angle which is maintained even when the torque of the electric motor 42 is "0."

Accordingly, when the vehicle stops, a current may flow unnecessarily in the electric motor 42. Therefore, when all of the conditions (i), (ii), and (iii) are satisfied, the CPU 52 decreases the angle operation amount Tt* to "0." Accordingly, it is possible to decrease the torque command value Tm* to "0." Accordingly, it is possible to prevent an unnecessary current from flowing in the electric motor 42.

According to the embodiment described above, the following operations and advantages are additionally achieved.

(1) The CPU 52 calculates an axial force Taf which is an input of the normative model calculating process M30 by subtracting the decrease correction amount ΔTt* which is a value obtained by subtracting the angle operation amount Tt0* from the angle operation amount Tt* from the axial force Taf0. Accordingly, it is possible to curb an excessive increase of the magnitude of the estimated disturbance torque Tlde. That is, the angle operation amount Tt0* which is calculated in the angle operation amount calculating process M50 is an operation amount which is suitable for control of the pinion angle θp to the pinion angle command value θp*. Accordingly, when the value obtained by subtracting the angle operation amount Tt* from the angle operation amount Tt0* is not "0," there is concern that the pinion angle θp may diverge greatly from the pinion angle command value θp* and the magnitude of the estimated disturbance torque Tlde may increase excessively. In this case, since the angle operation amount Tt0* diverges from a value suitable for control of the pinion angle θp to the pinion angle command value θp*, controllability of the pinion angle θp may decrease when the angle operation amount Tt* is changed to the angle operation amount Tt0*.

(2) When the angle operation amount Tt* is "0," the CPU 52 substitutes a changed value K1 into the elasticity coefficient K and substitutes a changed value C1 into the stickiness coefficient C. Here, the changed values K1 and C1 are adapted to values for stabilizing the normative model calculating process M30 when the angle operation amount calculating process M50 is not reflected in operation of the electric motor 42. Accordingly, when the angle operation amount Tt* is "0," it is possible to curb an increase of the absolute value of a difference between the pinion angle command value θp* and the pinion angle θp. Accordingly, it is possible to smoothly restart control of the turning angle in the angle operation amount calculating process M50. On the other hand, when the angle operation amount Tt* is "0" and the normal values K0 and C0 are used, the normative model calculating process M30 is not stable, the pinion angle command value θp* fluctuates, and the like, whereby the absolute value of the difference between the pinion angle command value θp* and the pinion angle θp may fluctuate greatly. In this case, it is difficult to restart control of the turning angle in the angle operation amount calculating process M50.

(3) In the normative model calculating process M30, the steering angle command value θh* is calculated based on Expression (1) representing a normative model and the steering angle θh is controlled to the steering angle command value θh*. Accordingly, it is possible to adjust steering characteristics using a normative model.

(4) The target steering torque Th* is set based on the sum of the steering operation amount Ts* and the steering torque Th. Here, the target steering torque Th* which is required for improving a feeling of steering for a driver is likely to be determined based on a lateral force. On the other hand, since the sum of the steering operation amount Ts* and the steering torque Th can be converted to a lateral force of the vehicle, it is possible to easily design the process of calculating the target steering torque Th* by determining the target steering torque Th* based on the sum.

In the above-mentioned embodiment, the pinion angle θp can be considered as a convertible angle. The normative model calculating process M30, the steering angle ratio varying process M32, and the addition process M34 can be considered as an angle command value calculating process. The conversion process M76 and the operation signal generating process M78 can be considered as an operation process. The subtraction process M72 when the gain α is greater than "0" can be considered as a decrease process. The processes of S12 and S18 can be considered as a process of gradually decreasing the magnitude of the angle operation amount which is reflected in the operation process with respect to the magnitude of the angle operation amount which is calculated in the angle operation amount calculating process. The subtraction process M20 can be considered as a correction process. The inverter 43 can be considered as a drive circuit. The clutch 30 and the clutch driver 70 can be considered as a switching device. The processes of S18 to S22 can be considered as a change process. The process of S10 can be considered as a determination process. The base target torque calculating process M10, the addition process M12, and the hysteresis process M14 can be considered as a target steering torque calculating process.

Other Embodiments

The above-mentioned embodiment can be modified as follows. The embodiment described above and modified examples described below can be combined with each other as long as no technical contradictions arise.

In the embodiment, when all of the conditions (i), (ii), and (iii) are satisfied, execution conditions of the decrease process are satisfied, but the applicable embodiment is not limited thereto. For example, execution conditions may be determined to be satisfied when the conditions (i) and (ii) are satisfied.

Regarding the decrease process, in the embodiment, the current flowing in the electric motor 42 is decreased to "0" by gradually decreasing the angle operation amount Tt* to "0," but the applicable embodiment is not limited thereto. For example, the angle operation amount Tt* may be stepwise decreased to "0."

In the embodiment, the angle operation amount Tt* is decreased to "0," but the applicable embodiment is not limited thereto. For example, a process of gradually decreasing the angle operation amount Tt* to a prescribed value which is greater than "0" may be employed. Above all, gradual decreasing is not essential and, for example, the angle operation amount Tt* may be stepwise decreased to a prescribed value which is greater than "0." For example, a process of decreasing a value obtained by dividing the magnitude of the angle operation amount Tt* by the magnitude of the angle operation amount Tt0* to a predetermined value which is greater than "0" and less than "1" may be employed.

Regarding the change process, in the embodiment, the process of changing the elasticity coefficient K or the stickiness coefficient C is performed only when the angle operation amount Tt* is "0," but the applicable embodiment is not limited thereto. For example, when the value obtained by dividing the magnitude of the angle operation amount Tt* by the magnitude of the angle operation amount Tt0* is equal to or less than a predetermined ratio, the process of changing the elasticity coefficient K or the stickiness coefficient C may be performed.

The change process of changing the relationship between the axial force Taf which is an input of the normative model calculating process M30 and the steering angle command value θh* which is an output thereof is not limited to a process of changing the elasticity coefficient K or the stickiness coefficient C and, for example, a process of changing only one of two coefficients may be employed. When a normative model is changed, another parameter may be changed instead of changing both the elasticity coefficient K and the stickiness coefficient C.

In the embodiment, the angle operation amount Tt* is used as the required torque for the electric motor 42, but the applicable embodiment is not limited thereto. For example, the sum of the angle operation amount Tt* and the steering operation amount Ts* may be used as the required torque for the electric motor 42.

Regarding the angle command value calculating process, in the embodiment, the steering angle command value θh* is calculated using the axial force Taf as an input in the normative model calculating process M30, but the applicable embodiment is not limited thereto and, for example, the steering operation amount Ts* may be used as an input. In the embodiment, the steering angle command value θh* is calculated based on Expression (c1) or the like using the axial force Taf as an input, but a logic (model) for calculating the steering angle command value θh* is not limited thereto. For example, the steering angle ratio varying process M32 and the addition process M34 may be deleted and the output of the normative model calculating process M30 may be used as each of the steering angle command value θh* and the pinion angle command value θp*.

In the above-mentioned embodiment, the disturbance observer is constituted by a simple model in which the torque acting on the turning wheels 39 is balanced with a torque proportional to the angular acceleration of the turning angle, but the applicable embodiment is not limited thereto. For example, the disturbance observer may be constituted by a model in which the torque acting on the turning wheels 39 is balanced with the sum of a torque proportional to the angular acceleration of the turning angle and a torque proportional to the angular velocity of the turning angle.

The method of calculating the estimated disturbance torque Tlde is not limited to the examples described in the embodiment. For example, the estimated disturbance torque Tlde may be calculated by subtracting the angle operation amount Tt* and the steering torque Th from the second-order time differential value of the pinion angle command value θp* or a value obtained by multiplying the second-order time differential value of the pinion angle θp by the inertia coefficient Jp.

Regarding the angle operation amount calculating process, in the above-mentioned embodiment, the feed-forward operation amount Ttff is calculated based on the second-order time differential value of the pinion angle command value θp*, but the applicable embodiment is not limited thereto and, for example, the feed-forward operation amount Ttff may be calculated based on the second-order time differential value of the pinion angle θp or based on the second-order time differential value of the estimated value θpe.

In the above-mentioned embodiment, the feed-forward term is calculated by modeling the electric power steering system 10 using a simple model in which the torque acting on the turning wheels 39 is balanced with a torque proportional to the angular acceleration of the turning angle, but the applicable embodiment is not limited thereto. For example, the feed-forward term may be calculated using a model in which the torque acting on the turning wheels 39 is balanced with the sum of a torque proportional to the angular acceleration of the turning angle and a torque proportional to the angular velocity of the turning angle. This can be realized, for example, using the sum of a value obtained by multiplying the second-order time differential value of the pinion angle command value θp* by the inertia coefficient Jp and a value obtained by multiplying the first-order time differential value of the pinion angle command value θp* by the stickiness coefficient Cp as the feed-forward operation amount Ttff. Here, the stickiness coefficient Cp which is a proportionality coefficient of the angular velocity is different from the stickiness coefficient C which is used in the normative model calculating process M30 in purpose thereof, and is preferably obtained by modeling actual behavior of the electric power steering system 10 with maximum accuracy.

A feedback control amount out of the inputs of the feedback term calculating process M56 is not limited to the estimated value θpe or the first-order time differential value thereof. For example, the pinion angle θp or the time differential value thereof may be used instead of the estimated value θpe or the first-order time differential value thereof.

The feedback term calculating process M56 is not limited to the process of outputting the sum of the output values of a proportional element and a differential element. For example, an output value of a proportional element may be output or, for example, an output value of a differential element may be output. For example, a process of outputting the sum of at least one of the output value of a proportional element and the output value of a differential element and the output value of an integral element may be employed. When the output value of an integral element is used, the disturbance observer is preferably deleted. Above all, when the output value of an integral element is not used, the disturbance observer is not necessarily used.

In the above-mentioned embodiment, the pinion angle θp is used as the convertible angle, but the applicable embodiment is not limited thereto. For example, the turning angle of the turning wheels may be used as the convertible angle.

Regarding the steering operation amount, in the above-mentioned embodiment, the steering operation amount Ts* is converted to a torque for the steering shaft 14, but the applicable embodiment is not limited thereto. For example, it may be converted to the torque for the electric motor 42. In this case, for example, the sum of a value obtained by dividing the steering torque Th by the reduction gear ratio Km and the steering operation amount Ts* may be used as the axial force Taf0 or the sum of a value obtained by multiplying the steering operation amount Ts* by the reduction gear ratio Km and the steering torque Th may be used as the axial force Taf0.

Regarding the angle operation amount, in the above-mentioned embodiment, the angle operation amount Tt* is converted to the torque for the steering shaft 14, but the applicable embodiment is not limited thereto. For example, it may be converted to the torque for the electric motor 42. Here, for example, when the steering operation amount Ts* is converted to the torque for the steering shaft 14 and the sum of the steering operation amount Ts* and the angle operation amount Tt* is used as the required torque for the electric motor 42, the required torque is set to the sum of a value obtained by multiplying the angle operation amount Tt* by the reduction gear ratio Km and the steering operation amount Ts*.

Regarding the target torque calculating process, the base target torque calculating process is not limited to the process of calculating the base target torque Thb* based on the axial force Taf0 and the vehicle speed V. For example, a process of calculating the base target torque Thb* based on only the axial force Taf0 may be employed.

The process of correcting the base target torque Thb* using the hysteresis correction amount Thys is not necessary. In the above-mentioned embodiment, the IG signal is used as a travel permission signal, but the applicable embodiment is not limited thereto. For example, in a vehicle including an electrical rotary machine as an onboard power source that generates thrust of the vehicle, the travel permission signal of the vehicle may be a signal for closing a relay that can supply electric power to the electrical rotary machine. It is not essential to switch the clutch 30 to a disengaged state under the condition that the travel permission signal is in an ON state, and the clutch 30 may be maintained in the disengaged state in principle except for a fail-safe process such as occurrence of an abnormality in the turning actuator 40.

The turning control system is not limited to a system that includes the CPU 52 and the ROM 54 and performs software processes. For example, a dedicated hardware circuit (for example, an ASIC) that performs at least a part of the software processes performed in the above-mentioned embodiment in hardware may be provided. That is, the turning control system may have at least one of the following configurations of (a) to (c): (a) a configuration including a processor that performs all the processes in accordance with a program and a program storage device such as a ROM that stores the program; (b) a configuration including a processor that performs some of the processes in accordance with a program, a program storage device and a dedicated hardware circuit that performs the other processes; and (c) a configuration including a dedicated hardware circuit that performs all the processes. Here, the number of software processing circuits including a processor and a program storage device or the number of dedicated hardware circuits may be two or more. That is, the processes have only to be performed by a processing circuit including i) one or more software processing circuits, ii) one or more dedicated hardware circuits, or iii) one or more software processing circuits and one or more dedicated hardware circuits.

The electric power steering system is not limited to a steer-by-wire system and, for example, the clutch 30 is deleted in FIG. 1 and the steering shaft 14 may be mechanically connected to the pinion shaft 32 via a gear ratio varying mechanism that varies a gear ratio instead. In this case, for example, when all the conditions (i), (ii), and (iii) are satisfied and connection between the steering shaft 14 and the pinion shaft 32 is cut off, the process flow illustrated in FIG. 3 is effective.

In the above-mentioned embodiment, the electric power steering system 10 includes the clutch 30 that cuts off transmission of power between the steering wheel 12 and the turning wheels 39, and turning control is normally performed when the transmission of power is cut off by the clutch 30, but the applicable embodiment is not limited thereto. For example, the electric power steering system 10 may employ a configuration in which the steering wheel 12 and the turning wheels 39 are mechanically connected to each other. In this case, for example, when a controller that calculates the pinion angle command value θp* based on an operation of the steering wheel 12 and performs feedback control of the pinion angle θp to the pinion angle command value θp* is employed, a large current may flow unnecessarily in the electric motor 42 when a driver does not operate the steering wheel 12 at the time of stopping. Accordingly, it is effective to decrease the magnitude of the angle operation amount Tt*.

The electric motor is not limited to an SPMSM, but may be an IPMSM or the like. The electric motor is not limited to a synchronous machine, but may be an induction machine. In addition, for example, the electric motor may be a direct-current electric motor with a brush. In this case, an H-bridged circuit may be employed as the drive circuit.

The turning actuator is not limited to the examples described in the above-mentioned embodiment. For example, a so-called dual pinion type including a second pinion shaft that transmits power of the electric motor 42 to the rack shaft 36 separately from the pinion shaft 32 may be employed. For example, a configuration in which the output shaft 42a of the electric motor 42 is mechanically connected to the pinion shaft 32 may be employed.

The vehicle is not limited to a vehicle including only an internal combustion engine as an onboard power source that generates thrust of the vehicle and, for example, a vehicle including an internal combustion engine and an electrical rotary machine may be used. Above all, a vehicle need not an internal combustion engine.

What is claimed is:

1. A turning control system that operates a turning actuator having an electric motor incorporated therein and turning a turning wheel, the turning control system comprising a controller configured to perform:

a steering operation amount calculating process of calculating a steering operation amount of the electric motor for turning the turning wheel, the steering operational amount being convertible to a torque required for the electric motor to convert an input steering torque input by a driver to a target steering torque by feedback control;

an angle command value calculating process of calculating, based on the steering operation amount, an angle command value of a convertible angle which is convertible to a turning angle of the turning wheel;

an angle operation amount calculating process of calculating an angle operation amount which is convertible to the torque required for the electric motor for converting the convertible angle to the angle command value by feedback control;

a decrease process of decreasing a magnitude of the angle operation amount calculated in the angle operation amount calculating process when a vehicle speed is equal to or lower than a prescribed speed and a magnitude of the input steering torque is equal to or less than a prescribed value;

a correction process of correcting an input when the decrease process is performed such that a magnitude of the input decreases when the angle command value calculating process calculates the angle command value; and an operation process of operating a drive circuit of the electric motor to control the torque of the electric motor based on the angle operation amount.

2. The turning control system according to claim 1, wherein the controller is configured to perform the decrease process when transmission of power between the steering wheel and the turning wheel is cut off.

3. The turning control system according to claim 1, wherein the decrease process is a process of gradually decreasing the magnitude of the angle operation amount calculated in the angle operation amount calculating process.

4. The turning control system according to claim 1, wherein the angle command value calculating process includes a change process of changing a relationship of an output with the input when the decrease process is performed.

5. The turning control system according to claim 1, wherein the operation process includes a process of controlling the torque of the electric motor based on the angle operation amount regardless of the steering operation amount.

6. The turning control system according to claim 1, wherein the decrease process includes a determination process of determining whether at least a condition that the vehicle speed is equal to or lower than the prescribed speed, a condition that the magnitude of the input torque is equal to or less than the prescribed value, and a condition that a magnitude of a steering rate is equal to or lower than a prescribed rate are all satisfied, and wherein the decrease process is a process of decreasing the magnitude of the angle operation amount which is calculated in the angle operation amount calculating process when it is determined in the determination process that all the conditions are satisfied.

7. The turning control system according to claim 1, wherein the controller is configured to perform a target steering torque calculating process of calculating the target steering torque based on a sum of amounts which are obtained by converting the steering operation amount and the input steering torque to a force acting on a same object.

\* \* \* \* \*